United States Patent [19]

Hillock

[11] Patent Number: 4,637,115

[45] Date of Patent: Jan. 20, 1987

[54] CORE PLUG DRIVER TOOL

[76] Inventor: William E. Hillock, R.R. #1, Box 285, Danville, Ind. 46122

[21] Appl. No.: 806,417

[22] Filed: Dec. 9, 1985

[51] Int. Cl.[4] .................. B23P 19/04

[52] U.S. Cl. .................. 29/275

[58] Field of Search .................. 29/275, 276, 277, 270, 29/267, 219, 235

[56] References Cited

U.S. PATENT DOCUMENTS

| | | | |
|---|---|---|---|
| 1,286,449 | 12/1918 | Timmerman | 29/267 |
| 2,861,330 | 11/1958 | Kratz | 29/275 |
| 2,921,368 | 1/1960 | DeLucia | 29/267 |
| 3,064,342 | 11/1962 | Wagoner | 29/275 |
| 3,747,195 | 7/1973 | Rigsby et al. | 29/267 |
| 4,229,870 | 10/1980 | Tate . | |
| 4,266,330 | 5/1981 | Conte | 29/267 |
| 4,341,004 | 7/1982 | Echols . | |
| 4,514,890 | 5/1985 | Stewart | 29/275 |
| 4,564,990 | 1/1986 | Rible | 29/267 |

*Primary Examiner*—Robert C. Watson
*Attorney, Agent, or Firm*—Woodard, Weikart, Emhardt & Naughton

[57] ABSTRACT

An improved tool for driving core plugs into the core plug holes of an engine block without having to remove the engine block from the vehicle. The tool comprises an arm support having a fastening means for fixedly fastening the arm support to a plurality of mounting holes normally provided to secure the oil pan to the engine block. A core plug driver having a cylindrically shaped driver head is pivotally connected to the arm support and is longitudinally and laterally adjustable relative to the arm support to compensate for differences in core plug hole locations in various types of engine blocks. A kit including a plurality of differently sized core plug drivers is also provided to permit installation of core plugs having various sizes. The tool provides a mechanical advantage in the installation of the core plugs which permits use in situations involving limited clearance space.

7 Claims, 5 Drawing Figures

CORE PLUG DRIVER TOOL

BACKGROUND OF THE INVENTION

The present invention relates generally to the field of hand tools and, more particularly, to a tool for installing core plugs into an engine block.

Engine blocks for internal combustion engines are typically provided with a number of holes which communicate between the coolant jacket and the exterior of the engine. These holes are normally closed by plugs known as core or "freeze" plugs. If the coolant inside the engine freezes, expansion of the engine coolant causes the core plugs to pop out, thus protecting the engine block from cracking.

Depending upon how well the engine coolant system is maintained and other operational factors, the core plugs may last a period of from several months to several years without replacement. Eventually, however, the core plugs will rust or weaken so as to require replacement.

Since the core plugs must withstand considerable engine operating temperatures and pressures, the core plugs must be driven into place with considerable force to insure an adequate press fit. This is operation commonly performed using a hammer. Often, there is insufficient clearance space with which to permit application of the necessary impact force to properly seat the plug. As a result, it is many times necessary to remove the engine block from the vehicle, at undesirable labor and expense. Further, if the plug is not properly aligned relative to the hole, the plug may not be seated properly when it is driven into place. Thus, it is often necessary to have a second person maintain the proper alignment of the core plug while it is being driven into place.

The following patent references disclose various types of tools for installing core plugs:

| Inventor | U.S. Pat. No. | Issued |
|---|---|---|
| Tate | 4,229,870 | Oct. 28, 1980 |
| Stewart | 4,514,890 | May 7, 1985 |
| Echols | 4,341,004 | July 27, 1982 |
| Wagoner | 3,064,342 | Nov. 20, 1962 |

None of the above references disclose a core or freeze plug tool which mounts to the engine block to provide positive positioning of the core plug driver relative to the hole. Further, none of the above references disclose a tool having a lever arm which gives the operator a mechanical advantage in driving the core plug into the plug hole.

SUMMARY OF THE INVENTION

A tool for driving core plugs into the core plug holes of an engine block, according to one embodiment of the present invention, comprises an arm support having a fastening means for fixedly fastening the arm support to the engine block. The fastening means mounts within a plurality of mounting holes provided to secure the oil pan to the engine block. The driver tool further comprises an arm pivotally mounted at one end to the arm support and a plug driver connected to the arm at a location along the arm spaced apart from the one end. The plug driver is characterized by having a cylindrical shaped head for driving a core plug into a desired one of the core plug holes in an engine block.

Accordingly, it is an object of the present invention to provide an improved tool for driving core plugs into the core plug holes of an engine block.

It is a further object of the present invention to provide an improved tool for driving core plugs into the core plug holes of an engine block which tool is capable of being positively secured in position over the core plug hole without the proper alignment having to be manually maintained.

It is a yet further object of the present invention to provide an improved tool for driving core plugs into the core plug holes of an engine block which tool provides a mechanical advantage to the operator in driving the core plug into its seat.

Another object of the present invention is to provide an improved tool having the above advantages and also being adjustable to permit installation of various sized core plugs in engines of various configurations.

Related objects and advantages of the present invention will become more apparent by reference to the following drawings and detailed description.

DESCRIPTION OF THE PREFERRED EMBODIMENT

Figure 1:
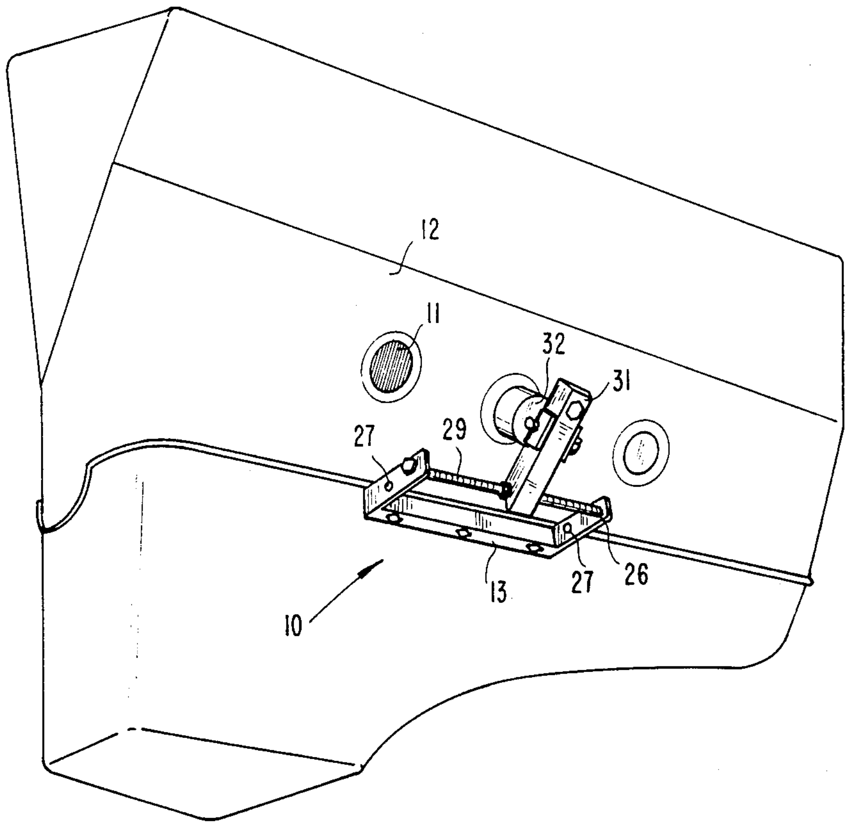
FIG. 1 is a perspective view showing the core plug driver tool mounted to an engine block.
Figure 2:
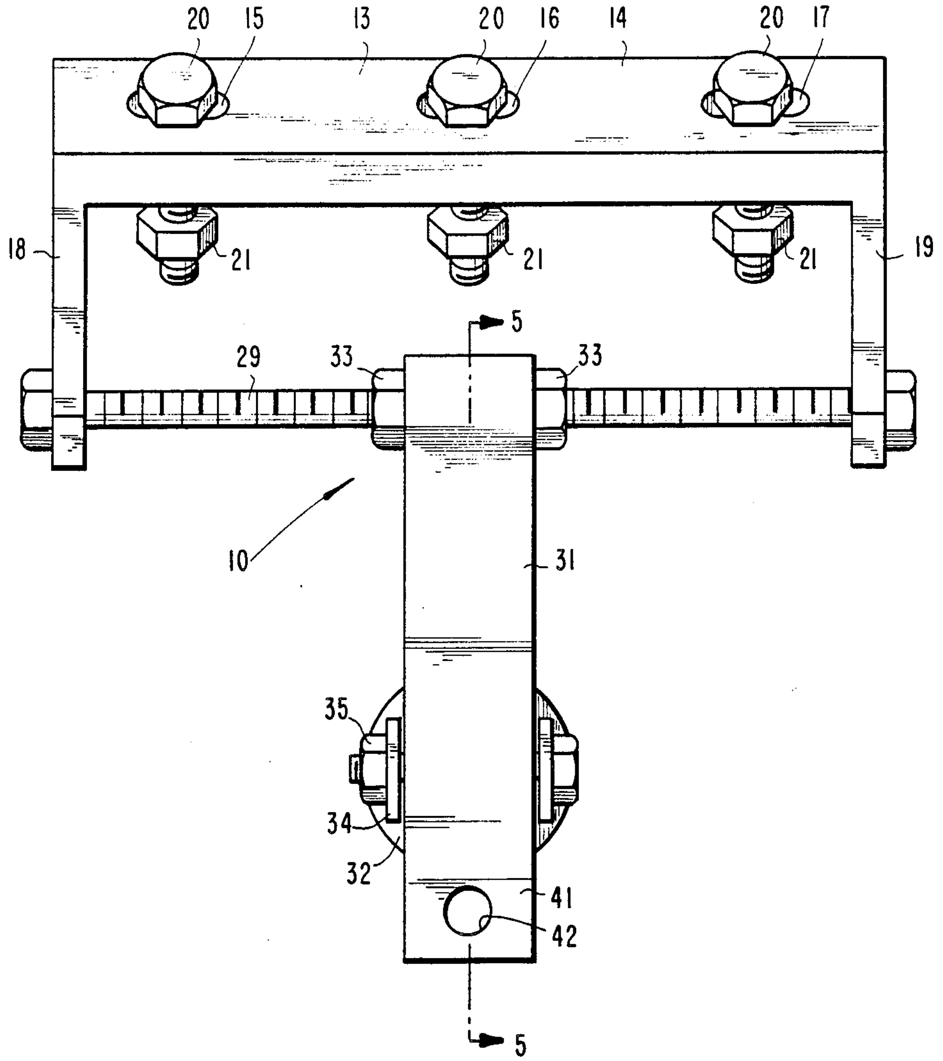
FIG. 2 is a perspective view showing the core plug driver tool in more detail.
Figure 5:
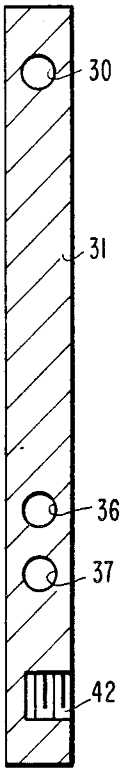
FIG. 5 is a section view of the arm taken along line 5—5 in FIG. 2.
Figure 4:
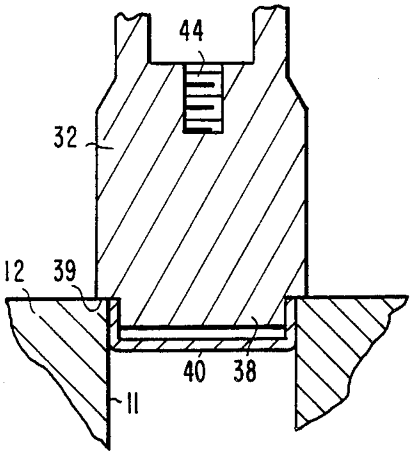
FIG. 4 is a section view showing the plug driver inserting a core plug into a core plug hole in the engine block.
Figure 3:
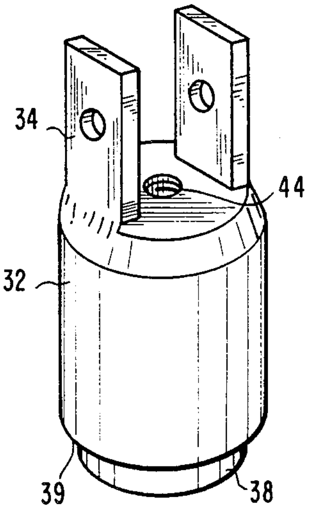
FIG. 3 is a perspective view of the plug driver.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, there is shown a tool 10 for driving cup-like shaped core plugs 40 into the core plug holes 11 of an engine block 12. It may be appreciated that the size and location of the core plug holes 11 shown in FIG. 1 is representative and will vary depending upon engine type.

The tool 10 generally comprises a U-shaped yoke 13 which integrally includes a central portion 14 and a pair of upturned legs 18 and 19. Central portion 14 has a series of three longitudinally spaced apart slots 15, 16 and 17, each of the which receives a bolt 20 and nut 21 combination which fastens to the engine block through the mounting holes normally used to mount the oil pan 25 to the engine block. Each slot has an elongate shape to compensate for different spacings between oil pan mounting holes on various types of engines.

Legs 18 and 19 include a plurality of axially aligned pairs of mounting holes 27 and 28 which selectively fixedly receive opposite ends of a screw threaded rod 29 at spaced apart locations along the legs, and permit further tool adjustment to compensate for engine design variations.

Arm 31 is pivotally mounted at one end to rod 29. Arm 31 is received over rod 29 through hole 30 in a sliding fit so as to permit the position of arm 31 to be adjustable laterally along rod 29. A nut 33 is threadably received over rod 29 on each side of arm 31 and provides a means for fixedly securing the position of arm 31 laterally on rod 29.

A plug driver 32 integrally includes a clevis 33 for pivotally connecting driver 32 to arm 31 by a nut and bolt combination 35 through mounting hole 36. An extra mounting hole 37 is also provided in arm 31 to permit the location of the driver head 32 to be varied along the length of arm 31 to compensate for variations in the distance between the oil pan mounting holes and the core plugs in various engine blocks. While arm 31 provides only two mounting locations for driver head 32, it should be understood that alternate means could be provided to permit further adjustment flexibility, if desired.

The plug driver 32 has a cylindrical shaped head 38 sized to receive thereover in a close sliding fit a core plug 40. Head 38 includes an annular flange 39 on the side of plug driver 32 opposite arm 31. Flange 39 is sized slightly larger than the diameter of the respective core plug hole 11 at the opening thereof so as to provide a stop which prevents the core plug 40 from being driven too far into the plug hole.

It should be noted that plug driver 32 is positioned between the free end of arm 31 and the end of arm 31 mounted to rod 29. This arrangement provides a surface 41 of arm 31 which extends outwardly of plug driver 32 and serves as a force applying surface for a suitable force transmitting means, such as a hammer. By applying force at a point offset outwardly from plug driver 32, arm 31 serves as a lever to provide a mechanical advantage in driving a core plug into a core plug hole. A threaded opening 42 is also provided in arm 31 to permit attachment of a suitable tool (not shown) to permit a driving force to be transmitted to plug driver 32 from a location remote from surface 41 if desired.

Plug driver 32 also includes a screw threaded hole 44 which is axially aligned with the cylindrical shaped head 38. The purpose of hole 44 is to permit plug driver 32 to be detached from arm 31 and alternatively attached to a force transmitting tool (not shown) having a more suitable impact surface for applying force with a hammer in situations where the use of the tool of the present invention is not needed. Such a situation may occur, for example, when the engine block is removed from the vehicle for other repairs and where there is no lack of clearance space to drive the plugs into place.

While only one core plug driver 32 is shown, it is to be understood that the invention contemplates a kit having a number of various sized plug drivers 32 corresponding to the different core plug sizes typically encountered.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A tool for driving core plugs into the core plug holes of an engine block, comprising:

an arm support having a fastening means for fixedly fastening said arm support to said engine block;

an arm pivotally mounted at one end to said arm support and having a free end opposite the one end of said arm, said arm further including a force applying surface adjacent the free end of said arm, said plug driver positioned between said force applying surface and the one end of said arm, said arm support including a means for movably adjusting the position of said arm along the length of said arm support, said arm support further including a yoke having said fastening means thereon and a rod mounted at opposite ends thereof to said yoke, said arm being slidably received over and pivotally mounted to said rod; and a plug driver pivotally connected to the free end of said arm at a location along said arm spaced apart from said one end, said plug driver having a cylindrical shaped head for driving a core plug into a desired one of the core plug holes in an engine block, whereby a mechanical advantage is provided in driving the core plug by application of force to said force applying surface.

2. The tool of claim 1 wherein said yoke integrally includes a central portion and a pair of upturned legs at opposite ends of said central portion, said legs including a plurality of pairs of axially aligned mounting holes for mounting said rod at selective spaced apart locations along said legs.

3. The tool of claim 2 wherein said fastening means includes a plurality of elongated slots defined by the central portion of said yoke and a corresponding plurality of screw fasteners received in said slots, said screw fasteners arranged and disposed to mount within a plurality of mounting holes provided to secure an oil pan to an engine block.

4. The tool of claim 3 wherein said arm includes means for selectively positioning said plug driver at a plurality of locations along the length of said arm.

5. The of claim 4 wherein said plug driver includes an annular flange on the side of said driver opposite said arm.

6. The tool of claim 5 wherein said rod is screw threaded and includes a pair of threaded nuts received over said rod and adjustably positioned on opposite sides of said arm.

7. The tool of claim 6 wherein said plug driver defines a screw threaded hole axially aligned with said cylindrical shaped head.

* * * * *